(12) United States Patent
Choo et al.

(10) Patent No.: US 6,760,188 B2
(45) Date of Patent: Jul. 6, 2004

(54) DISC STACK ASSEMBLY HAVING A CLAMP PLATE AND A RETAINING RING TO CLAMP A DISC TO A SPINDLE MOTOR HUB

(75) Inventors: Victor ChiSiang Choo, Singapore (SG); Kok Loong Teng, Singapore (SG); Niroot Jierapipatankul, Singapore (SG); Kok Tong Soh, Singapore (SG); Johnny Soh, Singapore (SG); Sen Chai Khew, Singapore (SG); Chee Suan Low, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 291 days.

(21) Appl. No.: 09/961,962

(22) Filed: Sep. 24, 2001

(65) Prior Publication Data

US 2002/0071206 A1 Jun. 13, 2002

Related U.S. Application Data
(60) Provisional application No. 60/255,261, filed on Dec. 13, 2000, and provisional application No. 60/255,266, filed on Dec. 13, 2000.

(51) Int. Cl.$^7$ .............................................. G11B 17/028
(52) U.S. Cl. ................................................... 360/99.12
(58) Field of Search ........................... 360/97.01, 98.01, 360/98.07, 98.08, 99.01, 99.04, 99.05, 99.08, 99.12

(56) References Cited

U.S. PATENT DOCUMENTS

| | | | |
|---|---|---|---|
| 4,630,156 A | 12/1986 | Saito | 360/133 |
| 5,101,306 A | 3/1992 | Johnson | 360/98.08 |
| 5,243,481 A | 9/1993 | Dunckley et al. | 360/99.08 |
| 5,270,999 A | 12/1993 | Chessman et al. | 369/290 |
| 5,426,548 A | 6/1995 | Fujii et al. | 360/98.08 |
| 5,486,961 A | 1/1996 | Boutaghou et al. | 360/99.12 |
| 5,548,457 A | 8/1996 | Brooks et al. | 360/98.08 |
| 5,550,690 A | 8/1996 | Boutaghou et al. | 360/99.12 |
| 5,555,144 A | 9/1996 | Wood et al. | 360/98.08 |
| 5,590,004 A | 12/1996 | Boutaghou | 360/99.12 |
| 5,731,928 A | 3/1998 | Jabbari et al. | 360/98.08 |
| 5,801,901 A | 9/1998 | Bryan et al. | 360/98.08 |
| 5,847,900 A | 12/1998 | Iwabuchi | 360/98.08 |
| 5,880,905 A | 3/1999 | Kazmierczak et al. | 360/98.08 |
| 5,923,498 A * | 7/1999 | Moir et al. | 360/98.08 |
| 5,943,184 A * | 8/1999 | Kelsic et al. | 360/98.08 |
| 6,041,033 A * | 3/2000 | Otsubo et al. | 369/271 |
| 6,255,750 B1 * | 7/2001 | Mohajerani et al. | 310/51 |
| 6,282,054 B1 * | 8/2001 | Luo | 360/98.08 |
| 6,417,988 B1 * | 7/2002 | Renken et al. | 360/99.12 |
| 6,512,654 B2 * | 1/2003 | Teshima | 360/99.08 |
| 6,567,238 B1 * | 5/2003 | Renken et al. | 360/99.12 |
| 6,624,968 B1 * | 9/2003 | Chessman et al. | 360/99.12 |
| 2002/0069509 A1 * | 6/2002 | Choo et al. | 29/603.03 |

\* cited by examiner

Primary Examiner—Jefferson Evans
(74) Attorney, Agent, or Firm—Fellers, Snider, et al.

(57) ABSTRACT

A disc stack assembly for use in a disc drive. A spindle motor hub includes an annular ring recess. A disc is clamped to the spindle motor hub by a disc clamp assembly comprising a clamp plate and a retaining ring. The clamp plate includes an inner ring engagement portion, an outer disc engagement portion, and an initial, substantially planar shape in an undeformed state. The retaining ring is secured within the annular ring recess and maintains the clamp plate in a conically deformed state so that the inner ring engagement portion of the clamp plate applies a first moment force against the retaining ring while the outer disc engagement portion of the clamp plate applies a second moment force as an axially directed clamping force upon the disc.

20 Claims, 10 Drawing Sheets

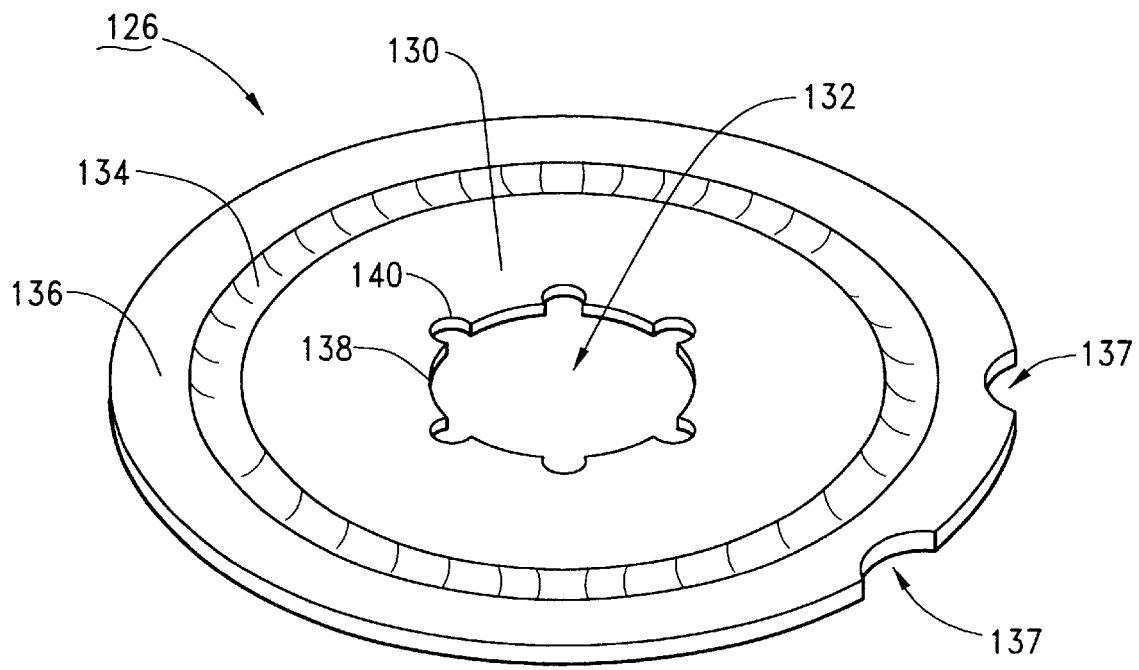
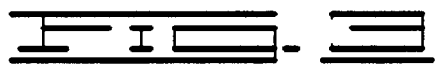
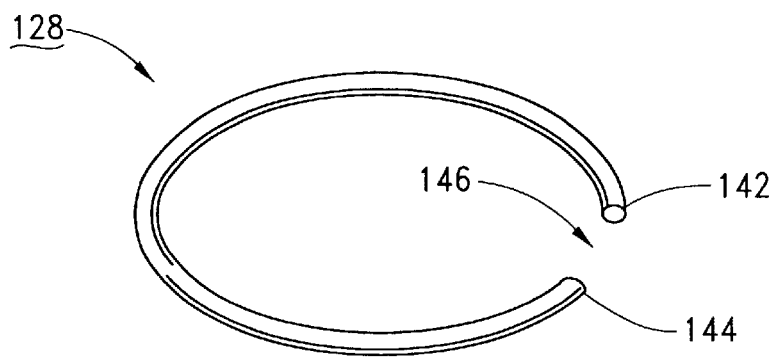
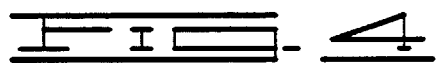

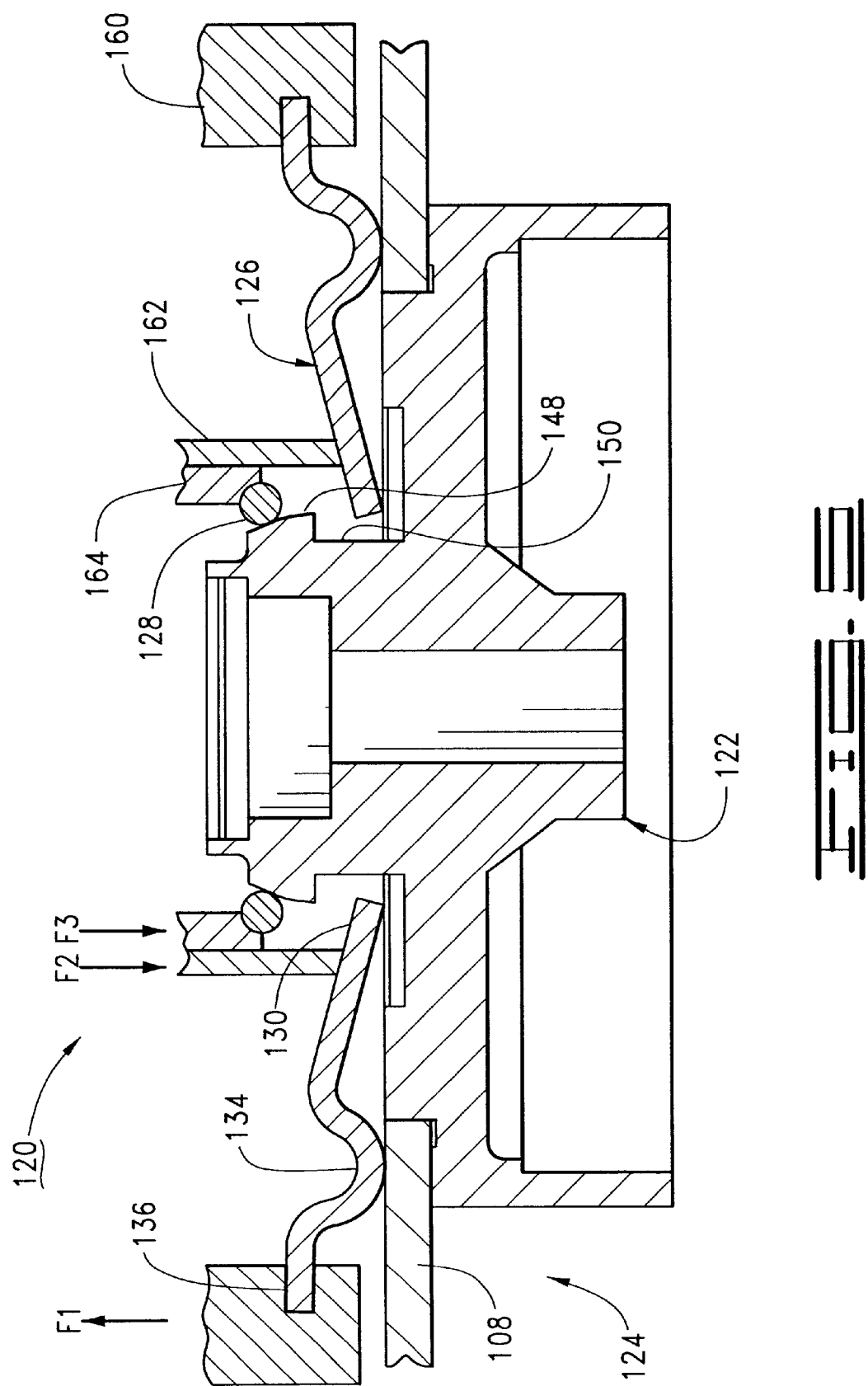

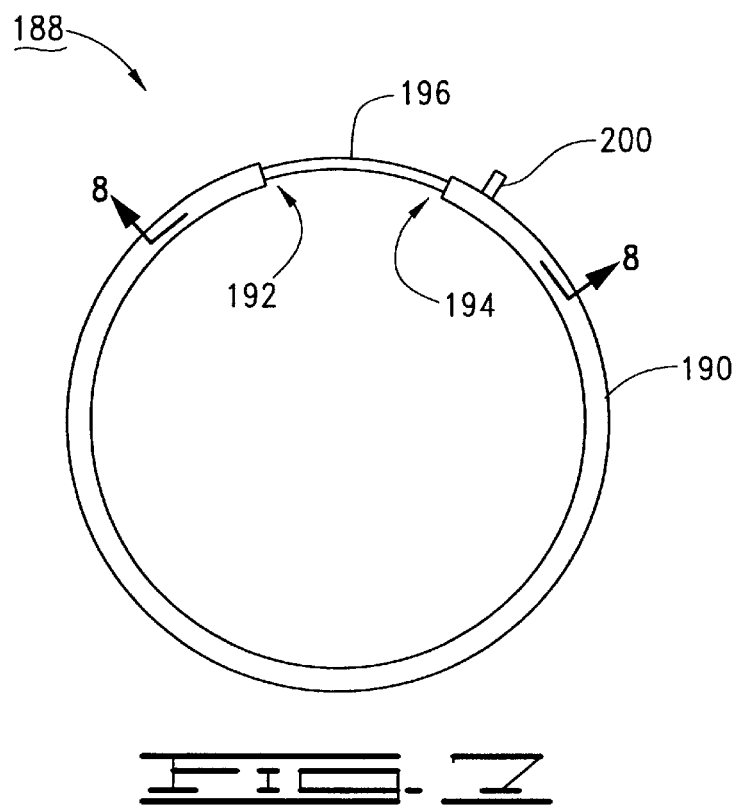
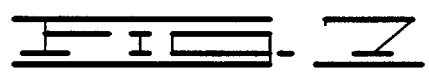
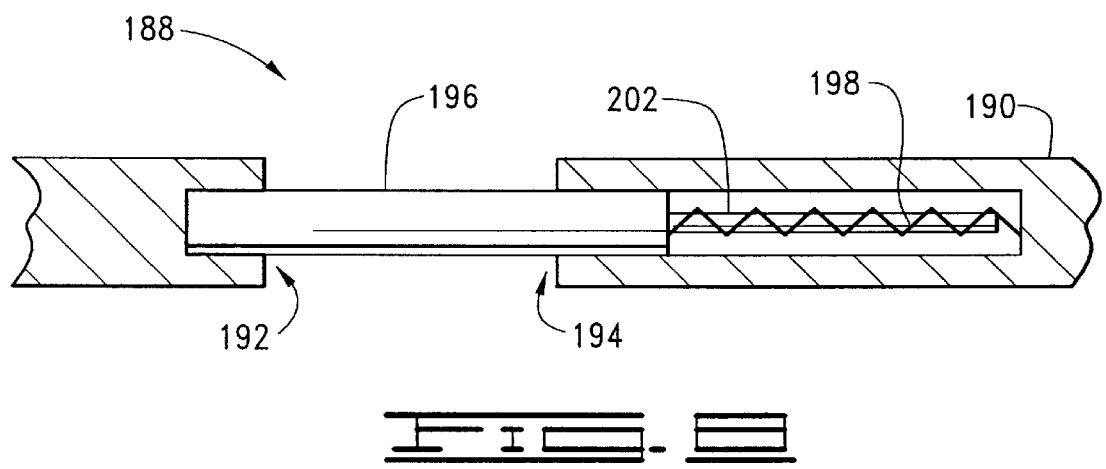
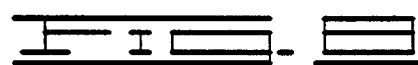

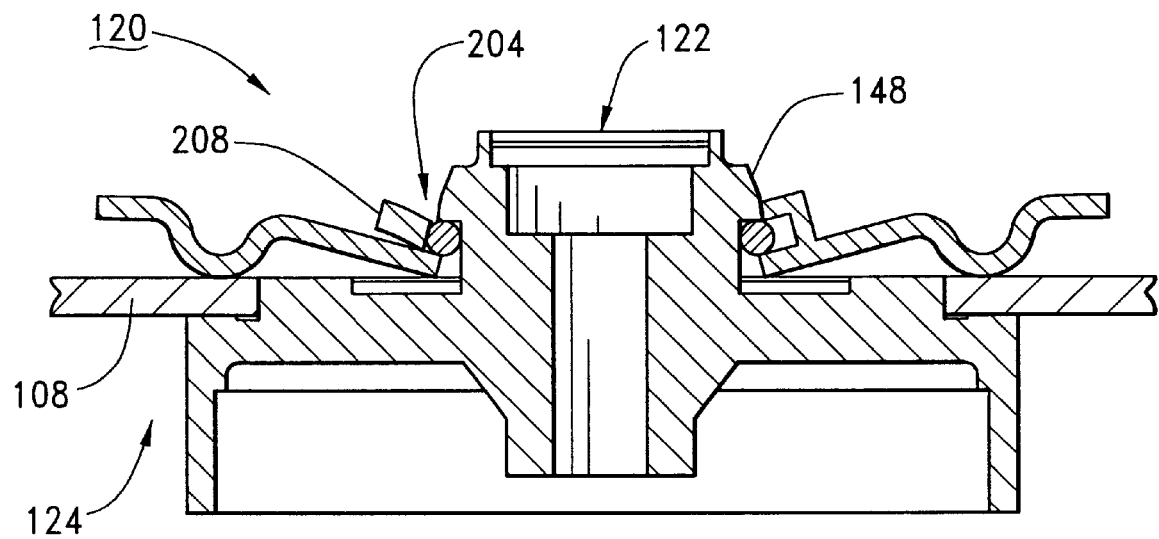
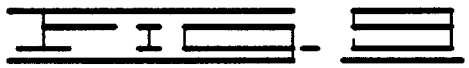
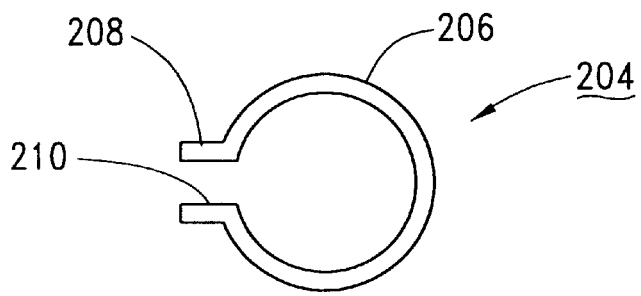
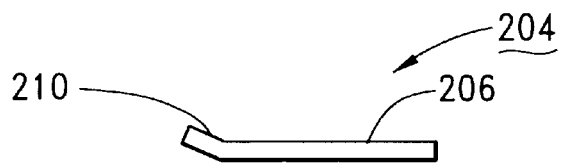

DISC STACK ASSEMBLY HAVING A CLAMP PLATE AND A RETAINING RING TO CLAMP A DISC TO A SPINDLE MOTOR HUB

RELATED APPLICATIONS

This application claims priority to Provisional Applications Nos. 60/255,261 and 60/255,266, both filed Dec. 13, 2000.

FIELD THE INVENTION

The claimed invention relates generally to the field of disc drive data storage devices and more particularly, but not by way of limitation, to an improved disc clamp assembly used to secure a number of discs to a spindle motor hub assembly in a disc drive disc stack assembly.

BACKGROUND

A disc drive is a data storage devices used to store digital data. A typical disc drive includes a number of rotatable magnetic recording discs which are axially aligned and mounted to a spindle motor for rotation at a constant, high speed. A corresponding array of read/write heads access tracks defined on the respective disc surfaces to write data to and to read data from the discs.

A disc clamp assembly is used to clamp the discs (and intervening disc spacers) to a spindle motor hub. The disc clamp assembly applies an axially directed clamping force to the resulting disc stack to secure the discs and spacers to the hub. A greater clamping force generally improves the ability of the disc stack to resist disc shifting in response to the application of mechanical shocks to the disc drive. However, the application of too great a clamping force upon the disc stack can induce undesired mechanical distortion of the discs. Localized variations in the amount of clamping force upon the topmost disc can also induce distortion of the discs.

With the continued industry trend of providing disc drives with smaller overall sizes and greater amounts of data storage capacity, the size of various disc drive components has been reduced, including reductions in the thickness of each disc. As the discs become thinner, the maximum amount of clamping force that can be applied to secure the discs to a spindle motor hub without causing mechanical distortion of the discs is also generally reduced.

Prior art disc clamp assemblies typically engage a feature of the spindle motor to exert the clamping force upon the discs. Such engagement can be accomplished through the use of threaded screws which fasten a clamp member to the spindle motor hub. The desired clamping force is exerted in relation to the torque applied to the screws. Other engagement methodologies have involved the use of interference fits between the clamp member and the spindle hub to wedge or otherwise lock the clamp member in place. These and other prior art disc clamp assemblies can readily generate undesired particulate contamination within the disc drive.

Moreover, during installation of such disc clamp assemblies a large axial force is applied to the spindle motor hub, which can undesirably result in the application of large axially directed forces to ball bearing assemblies used to rotate the spindle motor hub relative to a central shaft. Such forces can deform or otherwise damage the bearing assemblies, inducing runout errors during subsequent rotation of the discs. Such errors become increasingly undesirable with continued increases in track densities in subsequent generations of drives.

Further, prior art disc clamp assemblies can require significant assembly resources to install and correctly set the desired clamping force. Screw-type clamps require insertion and torquing of multiple threaded fasteners; interference-fit type clamps typically require complicated tooling to manipulate the various elements to achieve the final clamping configuration. Subsequent removal of the clamping assembly can also require significant resources and can lead to further generation of particulate contamination.

U.S. Pat. No. 5,101,306 issued to Johnson illustrates such deficiencies with the prior art. Johnson '306 discloses a rigid grip ring which engages a spindle motor hub. A push-on retaining ring is pressed down over in sliding contact with the grip ring to a final engagement position within a detent of the grip ring, after which the retaining ring bears against the grip ring to apply a clamp force to a disc stack. Johnson '306 potentially generates significant particulate contamination, requires relatively complicated tooling to install and subsequently remove the retaining ring, and applies significant axially-directed forces upon the spindle motor bearing assemblies during both installation and deinstallation of the retaining ring. Johnson '306 further appears to require manual (hand) operations to install and deinstall the clamp and is thus not readily adaptable for use in high volume automated assembly environments.

There is a need, therefore, for an improved disc clamp assembly which overcomes these and other deficiencies in the prior art and which applies more consistent and controlled axially directed clamping forces upon the discs and the spindle motor of a disc drive.

SUMMARY OF THE INVENTION

In accordance with preferred embodiments, a disc stack assembly is provided for a disc drive. The disc stack assembly includes a disc clamp assembly which clamps a number of discs to a rotatable hub of a spindle motor.

The disc clamp assembly includes a substantially disc shaped clamp plate and an annular retaining ring. The clamp plate has an inner ring engagement portion, an outer disc engagement portion, and an initial, substantially planar shape in an undeformed state. The retaining ring preferably has a generally split-ring configuration and is secured in an annular ring recess of the spindle motor hub.

The retaining ring maintains the clamp plate in a conically deformed state so that the inner ring engagement portion of the clamp plate applies a first moment force against the retaining ring while the outer disc engagement portion of the clamp plate applies a second moment force as an axially directed clamping force upon the disc. In this way, controlled clamping force can be applied to clamp the disc to the spindle motor without imparting significant axially directed force to a bearing assembly of the spindle motor.

These and various other features and advantages which characterize the claimed invention will be apparent from a reading of the following detailed description and a review of the associated drawings.

BRIEF DESCRIPTION OF THE DRAWINGS

FIG. 3 is a perspective view of a clamp plate of the disc clamp assembly of FIG. 2.

FIG. 4 is a perspective view of an annular retaining ring of the disc clamp assembly of FIG. 2.

FIG. 5 shows a preferred manner in which the disc clamp assembly is installed to limit the application of axially directed force upon bearing assemblies of the spindle motor.

FIG. 7 illustrates an alternative embodiment for the annular retaining ring in which the ring has a circlip construction.

FIG. 8 provides an elevational, cross-sectional view of the ring of FIG. 7 as viewed along line 8—8.

FIG. 9 illustrates an alternative embodiment for the disc clamp assembly.

FIG. 10 provides a top plan view of a retaining ring of FIG. 9 which includes a pair of opposing, radially extending flanges.

FIG. 11 is a side elevational view of the retaining ring of FIG. 10.

DETAILED DESCRIPTION

Figure 1:
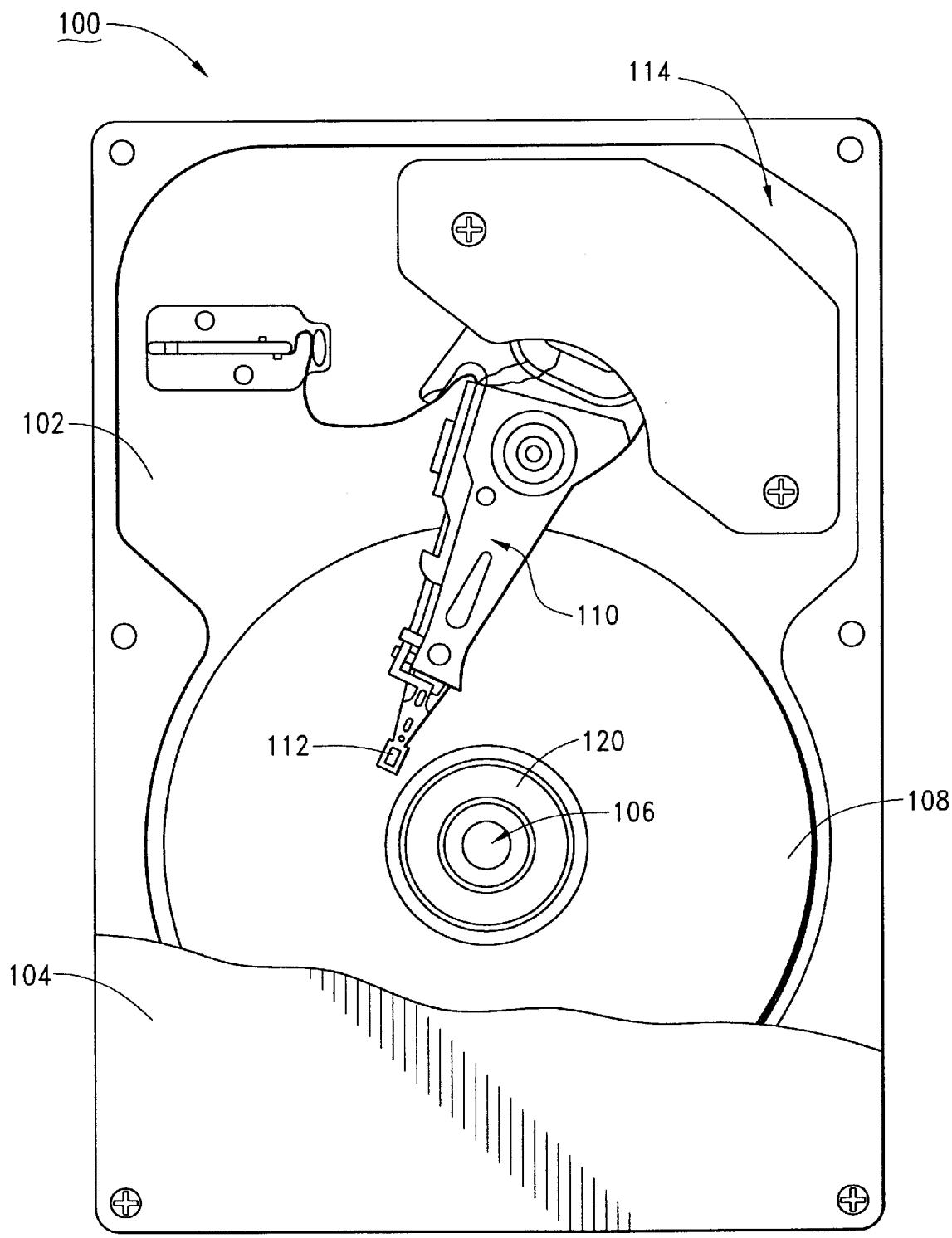
FIG. 1 is a top plan view of a disc drive constructed in accordance with preferred embodiments of the present invention.

FIG. 1 provides a top plan view of a disc drive 100 constructed in accordance with preferred embodiments of the present invention. A base deck 102 and a top cover 104 (shown in partial cutaway) cooperate to form a sealed housing for the disc drive 100. A spindle motor 106 rotates a magnetic recording disc 108 at a constant, high speed. An actuator assembly 110 supports an array of read/write heads 112 adjacent the respective disc surfaces. The actuator assembly 110 is rotated using a voice coil motor 114.

Figure 2:
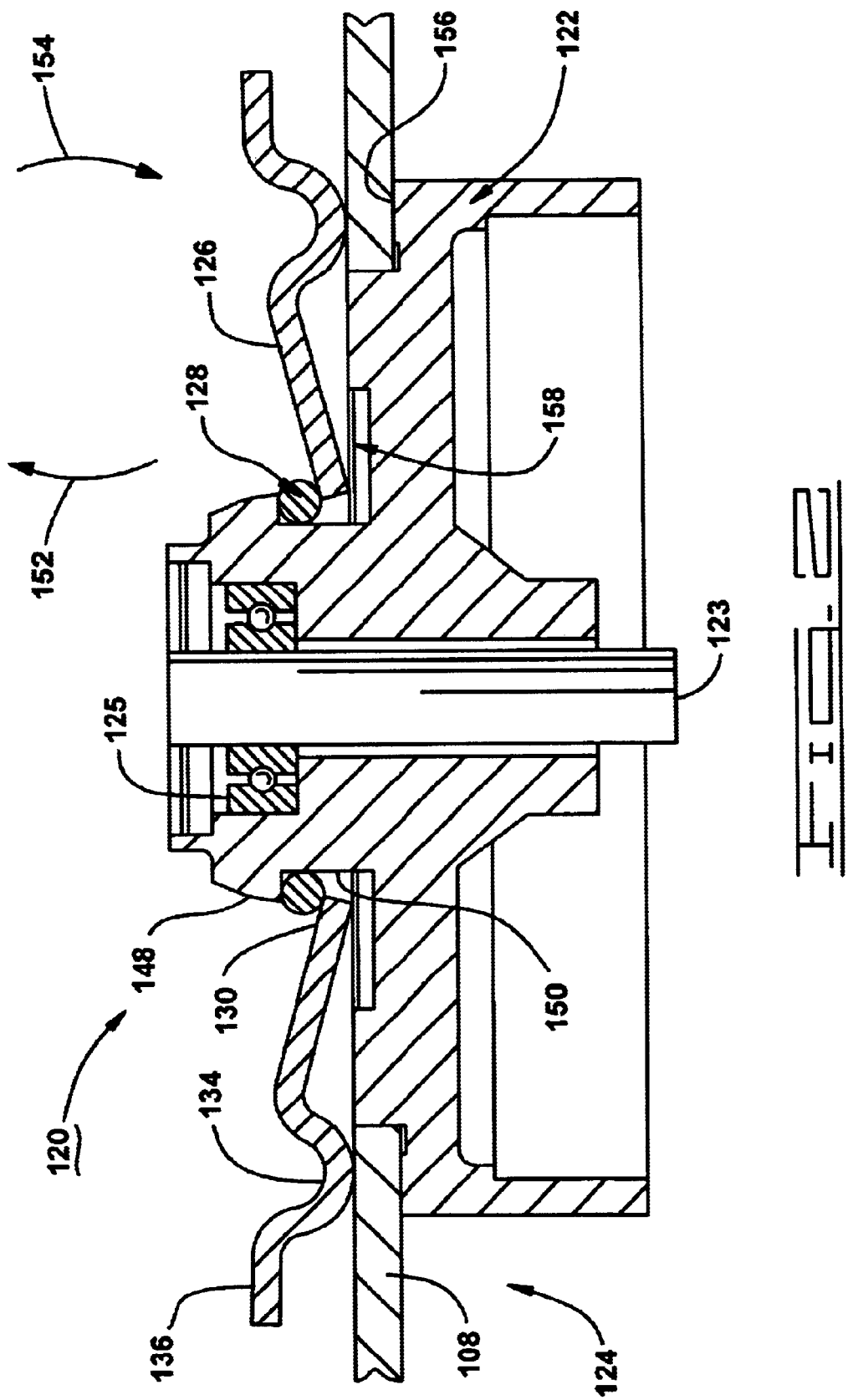
FIG. 2 provides a cross-sectional, elevational view of a disc stack assembly of the disc drive of FIG. 1 which includes a disc clamp assembly constructed in accordance with preferred embodiments to clamp a number of discs to a hub of a spindle motor.

A novel disc clamp assembly 120 secures the disc 108 to a hub 122 of the spindle motor 106, as shown in FIG. 2. The hub 122 is configured to rotate about an interior central shaft 123 of the spindle motor 106 through the use of one or more internal bearing assemblies (one of which is shown at 125). It will be noted that the internal configuration of the spindle motor 106 is not particularly germane to the present discussion and therefore various details such as the identification and location of spindle coils, permanent magnets, additional bearing assemblies, etc. have been omitted for simplicity of illustration.

The disc clamp assembly 120, the spindle motor hub 122 and the disc 108 collectively form a disc stack assembly 124. Although the embodiment of FIG. 2 shows only a single disc 108, it will be understood that the spindle motor hub 122 and disc clamp assembly 120 can readily be modified to accommodate any number of discs 108.

The disc clamp assembly 120 includes a disc shaped clamp plate 126 and an annular retaining ring 128 which locks the clamp plate 126 relative to the spindle motor hub 122. As shown in FIG. 3, the clamp plate 126 has a substantially planar shape in an initial, undeformed state and includes an inner ring engagement portion 130 that defines and surrounds a central opening 132, an outer disc engagement portion, also referred to herein as a disc engagement trough 134, and an annular hat flange 136 which projects radially outwardly from the trough 134. As discussed more fully below, notches 137 can be advantageously formed in the clamp plate 126 by removing material from the hat flange 136 at desired locations to correct imbalance in the assembled disc stack assembly 124.

The inner ring engagement portion 130 of the clamp plate 126 preferably includes a number of inwardly directed strain relief flanges 138 separated by recesses 140, which serve to give the central opening 132 a flower shape. The clamp plate 126 is preferably formed from a suitable rigid, spring material such as stainless steel or aluminum.

As further shown in FIG. 4, the retaining ring 128 preferably comprises a c-shaped split-ring with opposing ends 142, 144 that define a gap 146 therebetween. The retaining ring 128 is preferably formed from cylindrical shaped stainless steel or aluminum wire of uniform cross-section that is bent into the circular shape shown. The ring 128 is preferably selected to be sufficiently rigid to resist compression between the spindle motor hub 122 and the clamp plate 126 and at the same time sufficiently resilient to allow expansion from an original shape to an elastically-expanded shape to fit over the spindle motor hub 122.

With reference again to FIG. 2, the spindle motor hub 122 is provided with a circumferentially extending flange 148 and a recessed wall 150 which cooperate to form a recess that retainingly receives the ring 128. The ring 128 displaces the inner ring engagement portion 130 of the clamp plate 126 so that, in the installed state, the engagement portion 130 exerts an upwardly directed, circumferentially distributed moment force upon the ring 128, as represented by moment vector 152.

The disc engagement trough 134 applies a corresponding downwardly directed, circumferentially distributed moment force upon the disc 108, as represented by moment vector 154. Axially directed clamp forces are applied to the disc 108 by the disc engagement trough 134 and an opposing disc support flange 156 of the spindle motor hub 122. The inwardly directed flanges 138 (FIG. 3) provide strain relief within the clamp plate 126 and enable the trough 134 to provide a more uniform clamping force upon the disc 108.

A circumferentially extending recess 158 is provided adjacent the recessed wall 150 to provide a clearing relationship between the inner ring engagement portion 130 of the clamp plate 126 and the spindle motor hub 122. Thus, the clamp plate 126 does not come into direct contact with the spindle motor hub 122.

Figure 6:
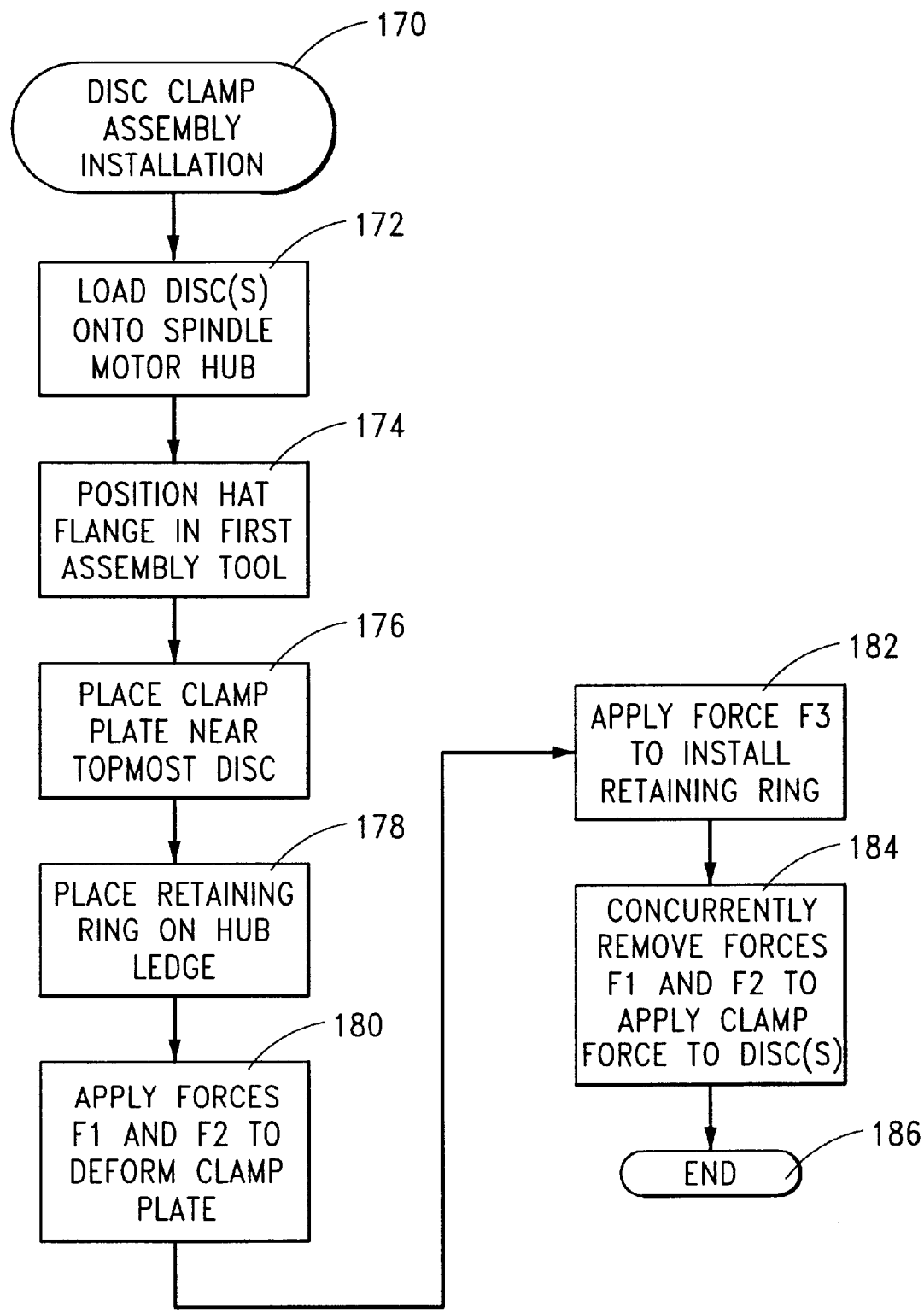
FIG. 6 is a flow chart for a DISC CLAMP ASSEMBLY INSTALLATION routine to illustrate a preferred method for installing the disc clamp assembly of FIG. 5.

The disc clamp assembly 120 is preferably installed as shown by FIGS. 5 and 6. FIG. 5 is similar to the view of FIG. 2 and illustrates a first assembly tool member 160 which engages the hat flange 136, a second assembly tool member 162 which engages the clamp plate 126 at a position adjacent the inner ring engagement portion 130, and a third assembly tool member 164 which engages the retaining ring 128.

FIG. 6 provides a flow chart for a DISC CLAMP ASSEMBLY INSTALLATION routine 170. At step 172, the disc (or discs and intervening spacers when multiple discs are used) are loaded onto the spindle motor hub 122. The hat flange 134 of the clamp plate 126 is grasped by the first assembly tool member at step 174 and the clamp plate 126 is placed over the spindle motor hub 122 at step 176 so that the disc engagement trough 134 is brought near in a desired clearing relationship with the topmost disc 108.

At step 178, the retaining ring 128 is placed onto the spindle motor hub flange 148. An upwardly directed holding force F1 is applied by the first assembly tool member 160 to the clamp plate 126 at step 180 to maintain the clearance between the disc engagement trough 134 and the disc 108 while a downwardly directed deforming force F2 is applied to the clamp plate 126 by the second assembly tool member 162 to deform the clamp plate 126, as shown in FIG. 5.

While maintaining the forces F1 and F2, the third assembly tool member 164 applies a downwardly directed force F3 to the retaining ring 128 at step 182 to pass the retaining ring 128 down over the hub flange 148 and into the recess defined by the hub ledge 148 and the retaining wall 150 (as shown in FIG. 2). Once the retaining ring 128 is in place, the forces F1 and F2 are removed at step 184 so that the ring engagement portion 130 of the clamp plate 126 engages the underside of the retaining ring 128 as the disc engagement trough 134 engages the top disc 108, thereby applying the final desired axially directed clamp force to the disc 108. The routine then ends at step 186.

While the retaining forces F1 and F2 can be removed separately during the operation of step 184, it will be noted that removing the F1 and F2 forces in a substantially concurrent fashion will tend to prevent the application of substantially any axially directed force to the spindle motor hub 122 as the clamp plate 126 is placed in the final clamping position. With reference again to FIG. 2, the gradual increased application of the moment force 152 upon the retaining ring 148 by the inner ring engagement portion as the second assembly tool member 162 is released will counteract the corresponding gradual increased application of the moment force 154 by the trough 134 upon the disc 108 as the first assembly tool member 160 is released. The force F3 required to pass the retaining ring 128 over the spindle flange 148 will be minimal; thus, the entire disc clamp assembly 120 can be advantageously installed without the transmission of substantially any axially directed force to the spindle motor bearing assemblies.

FIGS. 7 and 8 illustrate an alternative embodiment for a retaining ring 188 which can be substituted for the retaining ring 128 discussed above. The retaining ring 188 has a circular clip, or "circlip" construction, as commonly used with key chains and chain fasteners. The circlip 188 has annular body portion 190 with recesses 192, 194 to accommodate a sliding member 196. The member 196 is preferably biased by an internal spring 198 disposed within the recess 194 to place the circlip 188 in a closed position so that a distal end of the member 196 engages the recess 192.

A tab 200 projecting from the member 196 is actuated along a slot 202 in the recess 194 to retract the member 196 along the recess 194 and place the circlip 188 in an open position. Depending upon the configuration, the circlip 188 can advantageously reduce the required force F3 to install the circlip 188 on the spindle motor hub 122 as compared to the split ring 128. The sliding member 126 can be configured to bear against the inner ring engagement portion 130 of the clamp plate 126 to provide a 360 degree contact surface about the spindle motor hub 122.

FIG. 9 provides another embodiment of the disc clamp assembly 120. A retaining ring 204 is provided with an annular body portion 206 and opposing ring flanges 208, 210 which project from the body portion 206 as shown in FIGS. 10 and 11. The ring flanges 208, 210 provide gripping surfaces to facilitate placement of the retaining ring 204 onto the spindle motor hub 122, and to ease subsequent removal of the ring 204 during rework.

It will be noted that the ring flanges 208, 210 facilitate spreading of the ring 204 sufficiently to allow passage of the ring over the hub flange 148 without the application of any axial load forces to the spindle motor hub 122.

Figure 12:
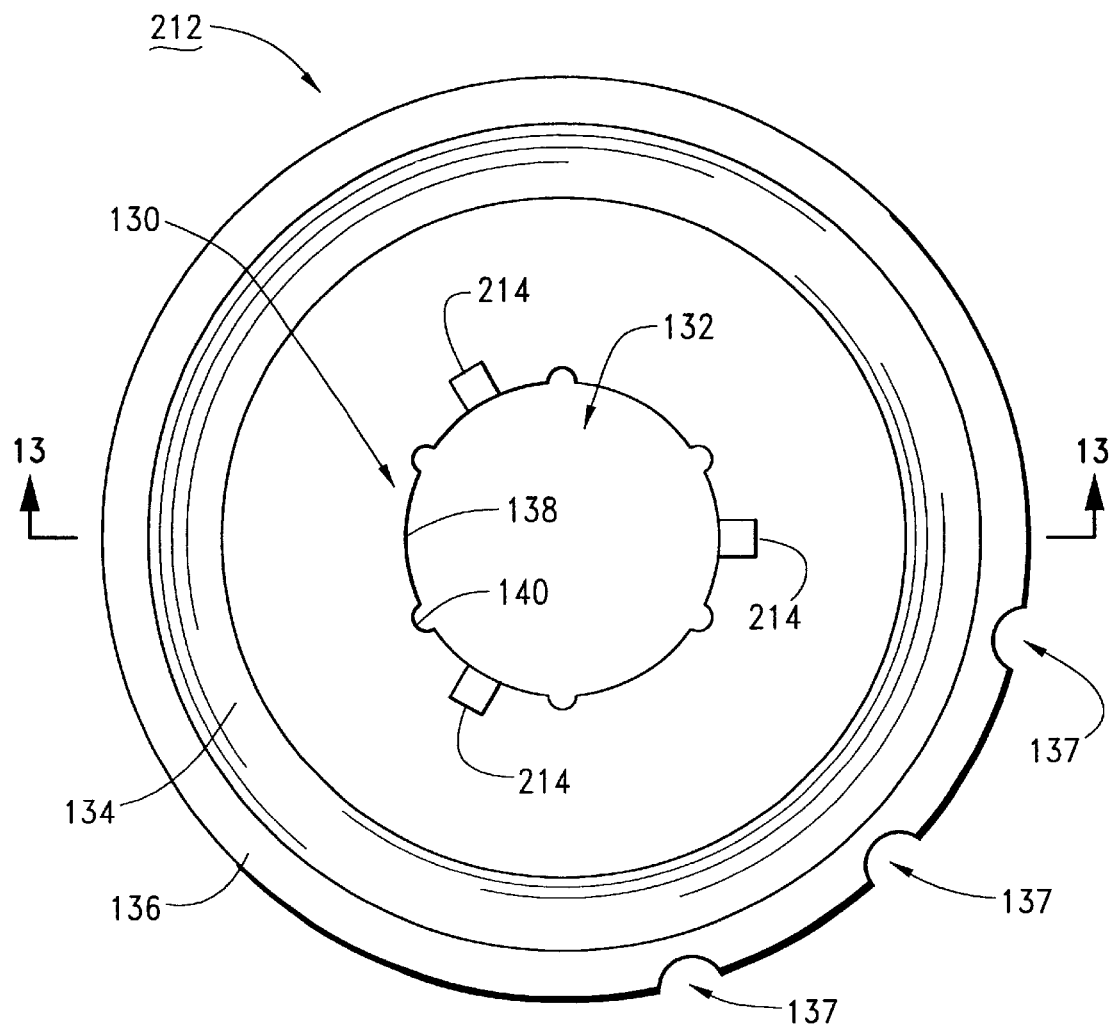
FIG. 12 is a top plan view of a clamp plate of FIG. 9 having a number of hook flanges which facilitate retention of the retaining ring with the clamp plate during automated assembly.
Figure 13:
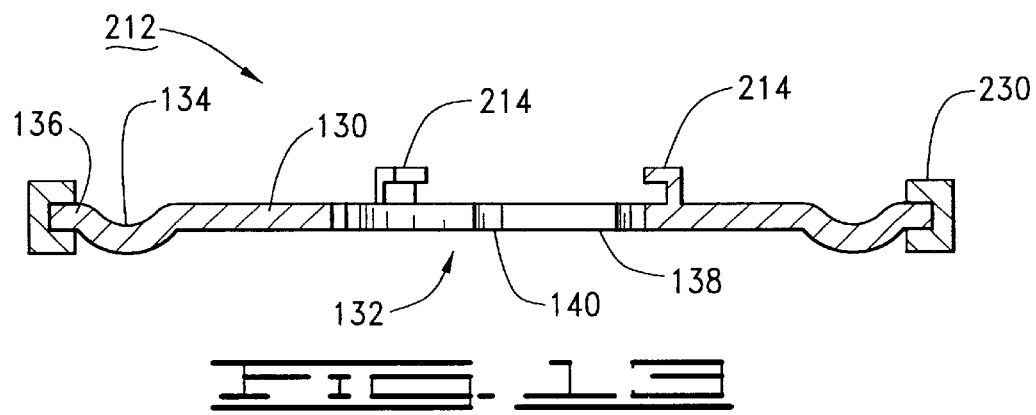
FIG. 13 is an elevational view of the clamp plate of FIG. 12.

The disc clamp assembly 120 further includes a clamp plate 212 similar to the clamp plate 126 discussed above. As shown in FIGS. 9, 12 and 13, hook flanges 214 project from the inner disc engagement portion 130 and serve to retain the retaining ring 204 with the clamp plate 126. In this way, the retaining ring 204 can be initially mated with the clamp plate 126 prior to assembly so that automated assembly equipment can more readily locate and manipulate the retaining ring 204 and clamp plate 212 during installation.

The ring flanges 208, 210 can further be disposed on opposing sides of a selected one of the hook flanges 214 to prevent rotation of the ring 204 with respect to the clamp plate 212 and to facilitate location and engagement of the ring flanges 208, 210 by such automated equipment. Although three hook flanges 214 spaced 120 degrees apart are shown in the embodiment of FIG. 12, it will be understood that other numbers of hook flanges 214 can be used. Equally spacing the hook flanges 214 about the central opening 132 is preferable so as to not undesirably induce imbalance about the spindle motor axis.

Figure 14:
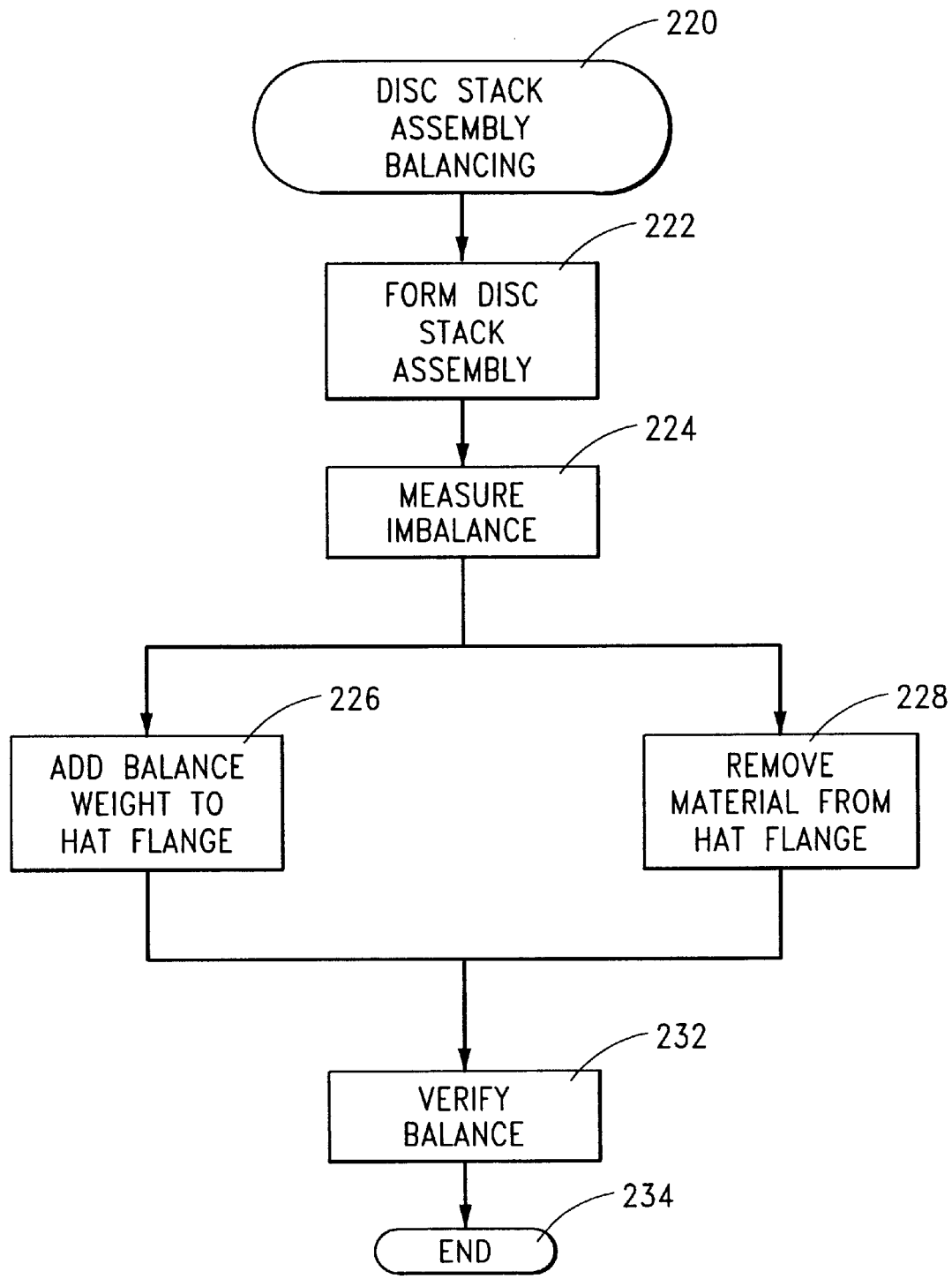
FIG. 14 is a flow chart for a DISC STACK ASSEMBLY BALANCING routine illustrative of preferred steps carried out to balance the disc stack assembly.

As mentioned above, the hat flange 136 of the clamp plates 126, 212 advantageously facilitates grasping by the first assembly tool member 160 during installation as well as allows balancing of the resulting disc stack assembly 124. FIG. 14 provides a flow chart for a DISC STACK ASSEMBLY BALANCING routine 220, illustrative of steps carried out in accordance with preferred embodiments.

At step 222, the disc stack assembly 124 is formed in accordance with the foregoing discussion of the various embodiments of the disc clamp assembly 120. At step 224, the assembled disc stack assembly 124 is rotated and imbalance is measured in a conventional fashion using suitable computerized test equipment. The resulting imbalance measurement will be expressed as a vector in terms of angular direction and mass.

The routine next passes to two alternative paths, step 226 or step 228. In step 226, a circumferentially extending balance weight (such as shown at 230 in FIG. 13) is selected to add a desired amount of mass at a desired angular orientation to cancel the imbalance measurement obtained in step 224. The balance weight 224 can take any number of forms and can be advantageously attached to and retained on the hat flange 136 as shown. A particularly advantageous balance clip is disclosed by U.S. Pat. No. 5,555,144 issued to Wood et al., assigned to the assignee of the present invention.

In alternative step 228, the location and amount of mass to be removed from the hat flange 136 to cancel the imbalance measurement obtained in step 224 are determined and the recesses 137 are formed by suitable cutting equipment (not shown). To reduce the propagation of contaminating particulates, the cutting equipment preferably includes a vacuum and seal system that surrounds the area of the hat flange 136 to be cut and evacuates the removed material from the disc stack assembly 124. Depending upon the application, additional balancing adjustments can also be applied to the underside of the spindle motor 106.

Regardless of the method in which the imbalance is corrected, the balance of the disc stack assembly is verified at step 232 and the process ends at step 234. It will be noted that if the disc stack assembly 124 is found to still have an unacceptable amount of imbalance, the respective balancing steps are repeated until the disc stack assembly 124 achieves adequate balance or the assembly is diverted from the process flow.

Figure 15:
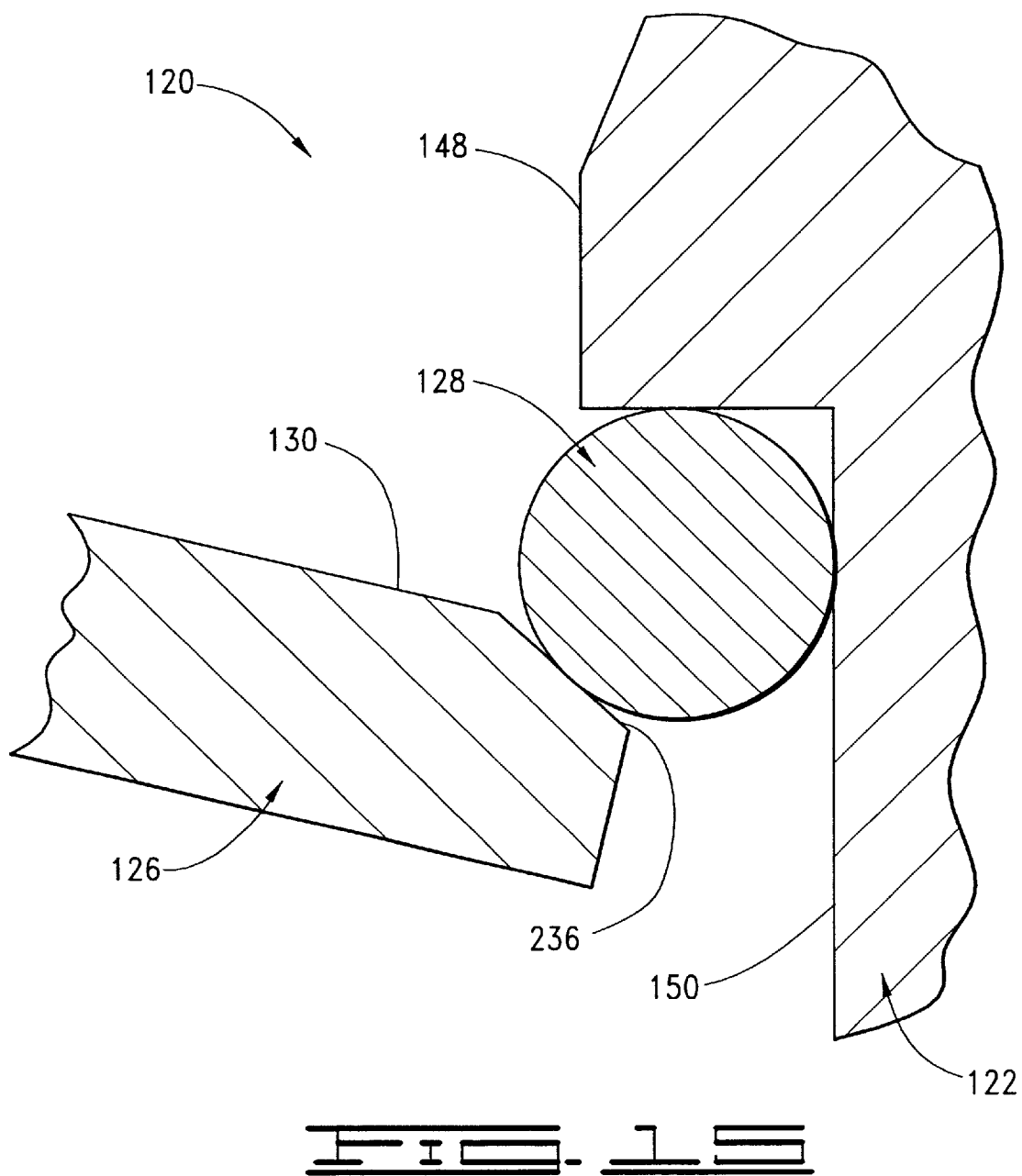
FIG. 15 shows another embodiment of the clamp plate.

Referring now to FIG. 15, shown therein is yet another preferred embodiment of the present invention. In FIG. 15, the clamp plate 126 is provided with a beveled surface 236 at the inner ring engagement portion 130 which provides a line contact with the retaining ring 128 as shown. The beveled surface 236 generally tends to provide improved circumferential distribution of the clamp force on the discs 108.

For embodiments having the plurality of inwardly directed flanges 138 (see FIG. 3), each of the flanges 138 is preferably provided with the beveled surface 236 as shown in FIG. 15. It will be noted that the particular length and angle of the beveled surface 236 is selected depending upon the requirements of a given application.

It will now be understood that preferred embodiments of the present invention are directed to a disc stack assembly (such as 124) of a disc drive (such as 100) comprising a spindle motor (such as 106) comprising a spindle motor hub (such as 122) configured for rotation about a motor axis, the spindle motor hub comprising an annular recessed wall (such as 150) which extends about the motor axis at a first radius and an annular hub flange (such as 148) adjacent the recessed wall which extends about the motor axis at a second radius greater than the first radius, the recessed wall and the hub flange forming an annular ring recess.

The disc stack assembly further comprises at least one disc (such as 108) disposed about the spindle motor hub; a substantially disc shaped clamp plate (such as 126, 212) disposed about the spindle motor hub and having an inner ring engagement portion (such as 130), an outer disc engagement portion (such as 134), and an initial, substantially planar shape in an undeformed state; and an annular retaining ring (such as 128, 188, 204) secured within the annular ring recess and which maintains the clamp plate in a conically deformed state so that the inner ring engagement portion of the clamp plate applies a first moment force (such as 152) against the retaining ring while the outer disc engagement portion of the clamp plate applies a second moment force (such as 154) as an axially directed clamping force upon the disc as the clamp plate attempts to return to the undeformed state.

In accordance with further preferred embodiments, the spindle motor hub includes a second annular recess (such as 158) adjacent the annular ring recess which provides a clearing relationship between the inner ring engagement portion and the spindle motor hub so that the clamp plate does not contact the spindle motor hub. The inner ring engagement portion of the clamp plate further preferably comprises a plurality of inwardly projecting ring engagement flanges (such as 138) which contactingly engage the retaining ring to provide stress relief within the clamp plate.

The clamp plate further preferably comprises an annular hat flange (such as 136) which extends from the outer disc engagement portion, the hat flange facilitating attachment of a balance weight (such as 230) or the formation of recesses (such as 137) to remove imbalance from the disc stack assembly. The clamp plate further preferably comprises a plurality of hook flanges (such as 214) which project from the inner ring engagement portion to retain the annular retaining ring with the clamp plate prior to placement of the clamp plate and the annular retaining ring on the spindle motor hub.

In accordance with preferred embodiments, the retaining ring comprises a split ring (such as 128) formed from a cylindrical wire of nominally uniform cross section which is formed into a substantially c-shape and having opposing ends (such as 142, 144) that define a gap (such as 146), wherein the gap facilitates expansion of the retaining ring to allow passage of the retaining ring over the hub flange and into the annular ring recess.

Alternatively, the retaining ring comprises a circlip configuration (such as 188) comprising an annular body (such as 190) with opposing ends (such as 192, 194) that define a gap and a sliding member (such as 196) which retracts into a recess in a selected one of the opposing ends to open the retaining ring and which extends across the gap and into a recess in the remaining one of the opposing ends to close the retaining ring. In yet another alternative embodiment, the retaining ring (such as 204) comprises an annular body portion (such as 206) and opposing, radially extending ring flanges (such as 208, 210), the ring flanges providing gripping surfaces to facilitate placement of the retaining ring into the annular ring recess and subsequent removal of the retaining ring during rework.

For purposes of the appended claims, the function of the recited "first means" will be understood as performed by the corresponding structure of the disc clamp assembly 120 including the clamp disc (126, 212) and the retaining ring (128, 188, 206). Clamp discs that contact the spindle motor hub are expressly excluded from the definition of an equivalent structure for purposes of such element.

It is to be understood that even though numerous characteristics and advantages of various embodiments of the present invention have been set forth in the foregoing description, together with details of the structure and function thereof, this detailed description is illustrative only, and changes may be made in detail, especially in matters of structure and arrangement of parts within the principles of the invention to the full extent indicated by the broad general meaning of the terms in which the appended claims are expressed. For example, the particular elements may vary depending on the particular application for the disc clamp assembly while maintaining the same functionality without departing from the spirit and scope of the invention.

In addition, although the embodiments described herein are directed to a disc clamp assembly for a disc drive, it will be appreciated by those skilled in the art that the disc clamp assembly can be used for other devices to secure a disc member to a rotatable hub member without departing from the spirit and scope of the claimed invention.

What is claimed is:

1. A disc stack assembly, comprising:
    a spindle motor hub configured for rotation about a motor axis and having an annular ring recess;
    a disc disposed about the spindle motor hub;
    a substantially disc shaped clamp plate disposed about the spindle motor hub and having an inner ring engagement portion, an outer disc engagement portion, and an initial, substantially planar shape in an undeformed state; and
    an annular retaining ring secured within the annular ring recess and which maintains the clamp plate in a conically deformed state so that the inner ring engagement portion of the clamp plate applies a first moment force against the retaining ring while the outer disc engagement portion of the clamp plate applies a second moment force as an axially directed clamping force upon the disc as the clamp plate attempts to return to the undeformed state, wherein the clamp plate and the retaining ring are mutually configured so that the clamp plate does not contact the retaining ring as the clamp plate is transitioned from the undeformed state to the deformed state.

2. The disc stack assembly of claim 1, wherein the spindle motor hub includes a second annular recess adjacent the annular ring recess which provides a clearing relationship between the inner ring engagement portion and the spindle motor hub so that the clamp plate does not contact the spindle motor hub.

3. The disc stack assembly of claim 1, wherein the inner ring engagement portion of the clamp plate comprises a plurality of inwardly projecting ring engagement flanges which contactingly engage the retaining ring.

4. The disc stack assembly of claim 1, wherein the clamp plate further comprises an annular hat flange which extends from the outer disc engagement portion in a direction opposite the inner ring engagement portion.

5. The disc stack assembly of claim 4, further comprising a balance weight attached to the hat flange to reduce imbalance in the disc stack assembly.

6. The disc stack assembly of claim 4, wherein a recess is formed in the hat flange by removal of material from the clamp plate to reduce imbalance in the disc stack assembly.

7. The disc stack assembly of claim 1, wherein the clamp plate further comprises a plurality of hook flanges which project from the inner ring engagement portion to retain the annular retaining ring with the clamp plate prior to placement of the clamp plate and the annular retaining ring on the spindle motor hub.

8. The disc stack assembly of claim 1, wherein the retaining ring comprises a split ring formed from a cylindrical wire of nominally uniform cross section which is formed into a substantially c-shape and having opposing ends that define a gap, wherein the gap facilitates expansion of the retaining ring to allow passage of the retaining ring over the hub flange and into the annular ring recess.

9. The disc stack assembly of claim 1, wherein the retaining ring comprises a circlip configuration comprising an annular body with opposing ends that define a gap and a sliding member which retracts into a recess in a selected one of the opposing ends to open the retaining ring and which extends across the gap and into a recess in the remaining one of the opposing ends to close the retaining ring.

10. The disc stack assembly of claim 1, wherein the retaining ring comprises an annular body portion and opposing, radially extending ring flanges, the ring flanges providing gripping surfaces to facilitate placement of the retaining ring into the annular ring recess and subsequent removal of the retaining ring from the annular ring recess.

11. The disc stack assembly of claim 1, wherein the spindle motor further comprises a bearing assembly which faciliates rotation of the spindle motor hub about the motor axis, and wherein operation of the clamp plate in exerting the first moment force against the retaining ring and exerting the second moment force as the axially directed clamping force upon the disc substantially prevents application of said axially directed clamping force to the spindle motor bearing assembly.

12. A disc drive, comprising:
a base deck;
a spindle motor supported by the base deck and comprising a spindle motor hub and a spindle motor bearing assembly which facilitates rotation of the spindle motor hub about a motor axis, the spindle motor hub having an annular recessed wall which extends about the motor axis at a first radius and an annular hub flange adjacent the recessed wall which extends about the motor axis at a second radius greater than the first radius, the recessed wall and the hub flange forming an annular ring recess;
a disc disposed about the spindle motor hub; and
first means for applying an axially directed clamping force to the disc to clamp the disc relative to the spindle motor hub and for substantially preventing application of said axially directed clamping force to the spindle motor bearing assembly.

13. The disc drive of claim 12, wherein the first means comprises a disc clamp assembly comprising:
a substantially disc shaped clamp plate disposed about the spindle motor hub and having an inner ring engagement portion, an outer disc engagement portion, and an initial, substantially planar shape in an undeformed state; and
an annular retaining ring secured within the annular ring recess and which maintains the clamp plate in a conically deformed state so that the inner ring engagement portion of the clamp plate applies a first moment force against the retaining ring while the outer disc engagement portion of the clamp plate applies a second moment force as an axially directed clamping force upon the disc as the clamp plate attempts to return to the undeformed state, wherein the clamp plate and the retaining ring are mutually configured so that the clamp plate does not contact the retaining ring as the clamp plate is transitioned from the undeformed state to the deformed state.

14. The disc drive of claim 13, wherein the inner ring engagement portion of the clamp plate comprises a beveled surface which forms a line contact with the retaining ring.

15. The disc drive of claim 13, wherein the inner ring engagement portion of the clamp plate comprises a plurality of inwardly projecting ring engagement flanges which contactingly engage the retaining ring to provide stress relief within the clamp plate.

16. The disc drive of claim 13, wherein the clamp plate further comprises an annular hat flange which extends from the outer disc engagement portion.

17. The disc drive of claim 13, wherein the clamp plate further comprises a plurality of hook flanges which project from the inner ring engagement portion to retain the annular retaining ring with the clamp plate prior to placement of the clamp plate and the annular retaining ring on the spindle motor hub.

18. The disc drive of claim 13, wherein the retaining ring comprises a split ring formed from a cylindrical wire of nominally uniform cross section which is formed into a substantially c-shape and having opposing ends that define a gap, wherein the gap facilitates expansion of the retaining ring to allow passage of the retaining ring over the hub flange and into the annular ring recess.

19. The disc drive of claim 13, wherein the retaining ring comprises a circlip configuration comprising an annular body with opposing ends that define a gap and a sliding member which retracts into a recess in a selected one of the opposing ends to open the retaining ring and which extends across the gap and into a recess in the remaining one of the opposing ends to close the retaining ring.

20. The disc drive of claim 13, wherein the retaining ring comprises an annular body portion and opposing, radially extending ring flanges, the ring flanges providing gripping surfaces to facilitate placement of the retaining ring into the annular ring recess and subsequent removal of the retaining ring during rework.

* * * * *